Aug. 7, 1923.
J. BOND
BARBECUE STOVE
Filed Aug. 15, 1921
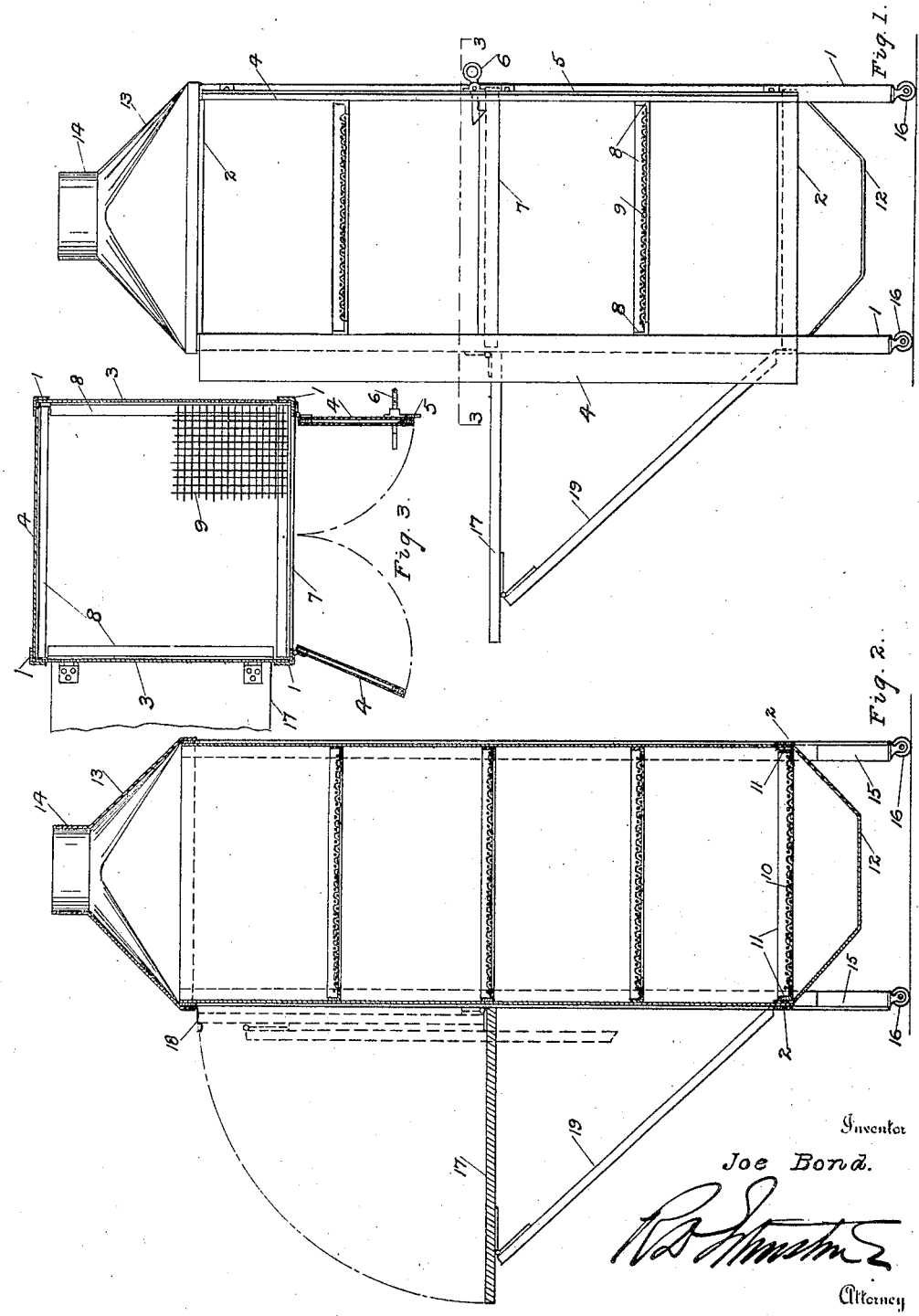
Inventor
Joe Bond.

Patented Aug. 7, 1923.

1,463,935

UNITED STATES PATENT OFFICE.

JOE BOND, OF BESSEMER, ALABAMA.

BARBECUE STOVE.

Application filed August 15, 1921. Serial No. 492,216.

*To all whom it may concern:*

Be it known that I, JOE BOND, a citizen of the United States of America, residing at Bessemer, in the county of Jefferson and State of Alabama, have invented certain new and useful Improvements in a Barbecue Stove, of which the following is a specification.

My invention relates to an improved type of stove especially designed and adapted for the efficient and economical cooking of barbecue meats.

It is a distinctive feature of my invention that the cooker comprises a vertically elongated casing having a plurality of superposed racks arranged therein at spaced intervals above the fire, different racks being adapted to receive the meats in different stages of cooking as my practice is to place fresh meat on the lowest rack next to the fire and advance it upwardly from rack to rack as its cooking progresses.

A further distinctive feature of my stove is that it is extremely efficient as a fuel consumer in that it is so arranged that the drippings from all cooking and cooked meats will fall into the fire and furnish the chief source of fuel to maintain the necessary moderate combustion desired for barbecue cooking.

A further object is to design the box with vertical doors which open to expose all the racks as well as the fire and by opening them I can regulate the temperature and slow up the cooking operation when such is needed.

My invention further contemplates the provision of a removable cap for the stove having a stack connection which adapts it to be readily utilized either for indoor or outdoor cooking. My arrangement of retaining the cooked meats on the top rack in the stove and serving therefrom has many important advantages, chief of which are the keeping of the meat hot, the utilization of all fat drippings to maintain combustion for the meat that is being cooked, and the prevention of flies or insects getting access to the cooked meat.

My invention further comprises the novel details of construction and arrangements of parts, which in their preferred embodiment only are illustrated in the accompanying drawings, in which:—

Fig. 1 is a front elevation of my improved barbecue stove with the doors open.

Fig. 2 is a vertical transverse section taken through the stove.

Fig. 3 is a cross sectional view on the line 3—3 of Fig. 1.

Similar reference numerals refer to similar parts throughout the drawings.

In its preferred embodiment the stove is formed of a metallic frame work comprising four angle iron legs 1 which extend to the top of the stove and are cross connected at top and bottom by metal bars 2. The open panels of the frame are closed by sheet iron sides 3 and back 4. I hinge to the front legs 1, the doors 4 which serve to form a front closure for the stove. The right hand door is provided with a flange 5 which overlaps the other door 4 when both are closed and the right hand door also carries a latch 6 which is adapted to engage, as a keeper, an angle iron 7 disposed across the door opening at the level of the intermediate cooking rack. Within the box I provide on opposite sides and across the back angle irons 8 forming three shelf supports, substantially equi-distantly spaced between the top and the bottom of the stove, and upon each of these supports I mount a rack or grid 9 for the meat to be cooked, these racks being readily removable through the front door of the stove, and being of such character as to permit the fat drippings from the meat on all to fall upon the grate 10 which rests upon internal angle irons 11 which are bolted to the bottom side bars 2 of the frame. Below the grate and also attached to the same bars 2 I mount an ash hopper 12 and enclose the top of the stove with a hood 13 having at its top a smoke discharge pipe 14. At the bottom of each leg I attach a wooden block or caster support 15 and mount casters 16 therein to make the stove easily movable.

In operation, charcoal is placed on the grate 10 and a fire is started with the front doors closed. After the fire is started fresh meat is placed on the lower rack and when it is about half done it is transferred to the next rack above and additional fresh meat is placed on the lower rack. By the time the later meat is half done, the meat on the intermediate rack is cooked and it is transferred then to the top rack, and meanwhile by opening the doors patrons can be served from the desired rack according to whether they desire rare or well done meat. It is to be observed that all fat dripping during the cooking of the meat and while it is being kept hot on the stove ready for service will fall onto the charcoal fire and it is in effect the consumption of these drippings that furnishes the chief source of fuel for cooking the meat. In order to best obtain this advantage it is desirable to contract the cross sectional area of the stove and provide a multiplicity of superposed cooking racks. Such an arrangement has the advantage of reducing the spread of the fire, requiring less fuel and concentrating the fat drippings on a relatively small fire.

If desired I may hinge to one side of the stove a shelf 17 normally held against the stove by a catch 18 and having a swinging brace leg 19 adapted by engagement with a bottom cross bar 2 below it, to support the shelf in horizontal extended position convenient for service of the barbecued meat. The ashes which fall through the grate can be pulled out of the hopper without opening the stove and the rate of consumption of the fuel can be regulated by the opening or closing of the stove doors, which, when closed, act like blowers to force the fire.

My invention is not intended to be restricted to the specific construction shown but can be variously modified within the scope of the appended claims.

Having thus described my invention, what I claim as new and desire to secure by Letters Patent, is:—

1. A barbecue stove comprising a vertically elongated body having a metallic frame work with metal sides and back mounted thereon, a plurality of superposed cooking racks, a fire grate, and a pair of doors at the front extending from top to bottom of the body and exposing said racks.

2. A barbecue stove having a bottom support for a grate, means to admit air below the grate, a door, a series of cooking racks removable through the door for cooking meat, and means to support meat at different elevations above the fire, as and for the purposes described.

In testimony whereof I affix my signature.

JOE BOND.

Witness:
NOMIE WELSH.